United States Patent [19]

Dodds et al.

[11] 4,067,408

[45] Jan. 10, 1978

[54] BALANCE MECHANISM

[75] Inventors: Ralph Lee Dodds, Thousand Oaks; Leland William Green, Los Angeles; Knight Llewellyn Harris, North Hollywood, all of Calif.

[73] Assignees: Knight L. Harris, North Hollywood; Leland W. Green, Los Angeles, both of Calif.

[21] Appl. No.: 745,421

[22] Filed: Nov. 26, 1976

[51] Int. Cl.² .................. G01G 3/14; G01G 1/38; G01G 1/18; G01G 21/24

[52] U.S. Cl. ............... 177/210 C; 177/212; 177/246; 177/255; 177/DIG. 9

[58] Field of Search .......... 177/210 C, 246, 255, 177/DIG. 9, 212

[56] References Cited

U.S. PATENT DOCUMENTS

| | | | |
|---|---|---|---|
| 3,635,298 | 1/1972 | Kistler | 177/210 C X |
| 3,734,218 | 5/1973 | Kupper | 177/255 X |
| 3,986,571 | 10/1976 | Strobel et al. | 177/210 C X |

FOREIGN PATENT DOCUMENTS

| | | | |
|---|---|---|---|
| 777,941 | 7/1957 | United Kingdom | 177/210 C |
| 919,771 | 2/1963 | United Kingdom | 177/210 C |

*Primary Examiner*—George H. Miller, Jr.
*Attorney, Agent, or Firm*—Lindenberg, Freilich, Wasserman, Rosen & Fernandez

[57] ABSTRACT

A balance mechanism for automatically lifting known weights in a single-arm balance comprised of two plates, a first plate supporting the known weights and a pan for an unknown mass to be weighed and a second counterbalancing plate coupled to the first through a box lever having diagonal corners connected to a support member through flexible elements that will permit the box lever to pivot about a diagonal axis in response to a vertical force at one free corner connected to a corner of one balance plate or in response to a vertical force at the other free corner connected to a corner of the other balance plate. One balance plate is secured in space by two taut rectangular loop lines, one line being connected taut to diagonally opposite corners of the plate and to elements affixed to the support member in a position over the free corners of the plate, and the other line being connected taut to the free corners of the plate and to elements affixed to the support member in a position over the other two corners. The other balance plate is secured in space parallel to the first plate in the same manner as the first plate by two taut rectangular loop lines, but relative to the first plate as the support member and oriented 90° from the first plate about an axis normal to the plates. Any force on one plate is coupled to the other plate by the box lever to cause the plates to move in opposite directions while the two pairs of taut lines maintain the plates substantially parallel regardless of whether or not the plates are horizontal or the force is normal to the plates.

18 Claims, 8 Drawing Figures

BALANCE MECHANISM

BACKGROUND OF THE INVENTION

This invention relates to a linear response force balance system, and more particularly to an improved mounting of a movable element in a supporting frame of a force balance system.

A preferred embodiment of the invention to be described with reference to the drawings is in a balance of the automatic-null type employing a displacement transducer having a stationary element and a load-responsive movable element. However, it should be recognized that the improved mounting of the movable element to a supporting frame may be used to equal advantage in other force balance systems. Consequently, the present invention is not to be construed as being limited to a balance per se.

In a double-arm beam balance, the weight of a mass is measured by placing the mass on a receiving pan on one arm and balancing the mass with known weights on the other arm until both arms of the beam supported at its center are motionless and level. A single-arm beam balance is similar, but instead of the beam being balanced by added weights at the opposite end of an unknown mass, the pan is preloaded with balancing weights. Once the unknown mass is added to unbalance the beam, balancing weights are removed until balance has been restored. The sum of the weights removed is equal to the unknown mass. This fundamental one-arm type of balance would lend itself readily to automation for those applications which do not require great precision. However, in weighing small masses with 1 mg resolution in a range of 0 to 40 grams, for example, the balance must be carefully leveled on a very stable bench or platform. Otherwise there may be torsion loading due to the difference in the vector of action of the mass-balance system and local gravity. While such torsion loading can be compensated by the use of a calibration mass differential, any additional torsion loading during the weighing process will be uncompensated, such as when the unknown mass is placed on a pan off center, or when known weights are removed from an off center position.

Another problem with a portable balance, besides leveling and calibrating, is achieving the necessary sensitivity for the desired resolution with a construction that is both rugged and economical. What is required for an economical balance that is both sensitive and rugged is some means for suspending a movable element in a supporting frame which has high compliance in a direction normal to the base of the frame and high tolerance for any tilt of the base in providing a linear displacement of the movable element in response to a mass (or force) loaded onto the movable element without the use of any rotational or slide bearings.

SUMMARY OF THE INVENTION

A linear response force balance system is provided in accordance with the present invention by two parallel plates secured to a support member by two pairs of taut rectangular loop lines. One taut line tethers a first pair of diagonally opposite points of one plate to points affixed to the support member over a second pair of diagonally opposite points on the first plate, where the second pair of points are on a line bisecting a line between the first pair of tethered points. The other taut line tethers the second pair of diagonally opposite points to points affixed to the support member over the first pair of diagonally opposite points on the first plate. The second plate is tethered in a similar manner to points affixed to the first plate, but with corresponding points oriented 90° about an axis normal to the plates. A biaxial (box) lever coupling one plate to the other has opposite ends on one axis connected to the support member and respective opposite ends on the second axis normal to the first axis connected to diagonally opposite tethered points of the first and second plates. Any force applied to one plate will cause the one plate to move in one direction and, through the biaxial lever, cause the other plate to move in the opposite direction while the two pairs of taut lines maintain the one plate parallel to the other. Capacitor plates disposed opposite to each other, one affixed to one plate and the other affixed to the other plate provide means for sensing displacement of the plates in linear response to a force applied to one plate over a small displacement range. Servo means responsive to a feedback signal proportional to sensed displacement restores the plates to their initial positions, thus providing a signal that is linearly proportional to the force applied to the one plate over a predetermined small range. To measure a greater force with precision, as when weighing an unknown mass, the one plate is preloaded with known weights of graduated sizes and the displacement detection means is adjusted for the initial condition of no unknown mass on the one plate. Once the unknown mass is loaded on the one plate, the feedback signal of the servo means is employed to control means for selecting and lifting weights in a proper combination to reduce the signal applied to the servo mechanism to a value within the small linear displacement range. Any feedback signal produced by any weight of the unknown mass on the one plate and applied to the control means but not offset by known weights removed from the plate is converted by suitable means to digital form and displayed. The control means displays in digital form the sum of the known weights removed and any remaining feedback signal remaining is converted to digital form and displayed with the sum of the weights removed to provide the total weight of the unknown mass to a fine degree of resolution.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
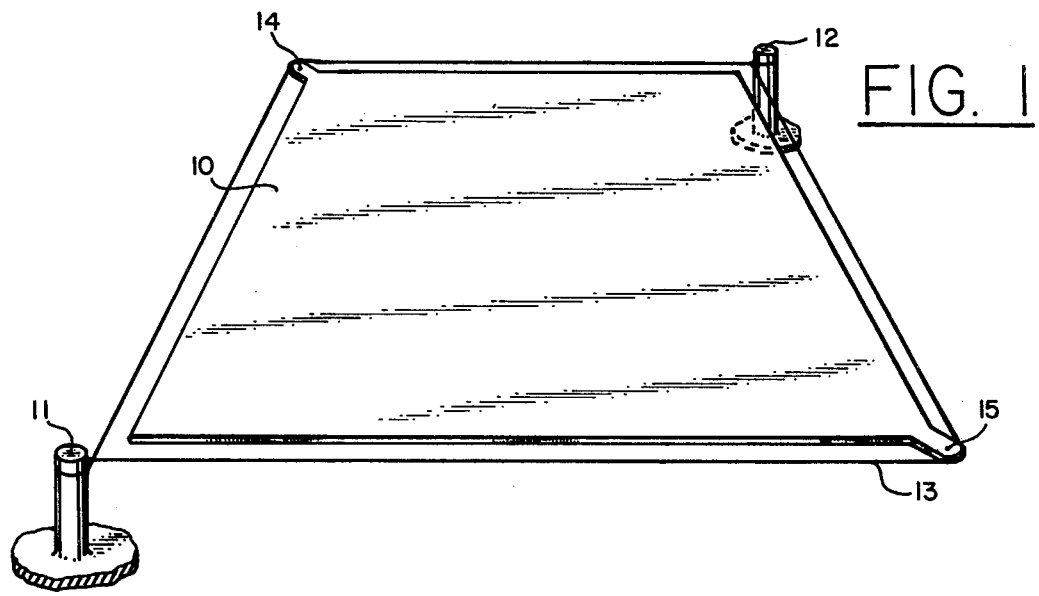
FIG. 1 illustrates a plate tethered by a taut line at diagonal corners to fixed posts disposed at free corners of the plate.

The principles of the new and improved mounting of a movable element in a supporting frame will first be described with reference to FIGS. 1 to 4. Following that, a preferred embodiment will be described in detail. Referring now to FIG. 1, a plate 10 is supported between two diametrically opposite posts 11 and 12 by a taut rectangular loop line (wire or band) 13 which is connected to the plate at only two diametrically opposite points 14 and 15 equally spaced between the two posts. Although a rectangular plate is shown, it is obvious that the plate may have other geometric shapes, such as circular or elliptical. Any force applied to the plate parallel to the taut line is transmitted to the supporting posts, and any motion produced in the plane of the taut line is limited to the elasticity of the line, which may be substantially zero for the magnitude of the forces which may occur in the particular application. Any off-center force applied perpendicularly to the plate will encounter virtually no restraint by the taut line. The plate will simply rotate about an axis between the posts and/or an axis between the tethered points 14 and 15 of the plate. However, if the force is applied at the precise geometric center of the plate, the plate can be displaced a small distance and for small amounts of displacement, the laterally stable plate moves in linear proportion to the force applied normal to the plate. Such motion could be used to devise a linear response force balance system, but it would not be practical because the center of gravity of the mass to be weighed must be placed precisely over the geometric center of the plate. Off center placement of the unknown mass will produce a rotational stimulus, unless rotation is somehow inhibited.

Figure 2:
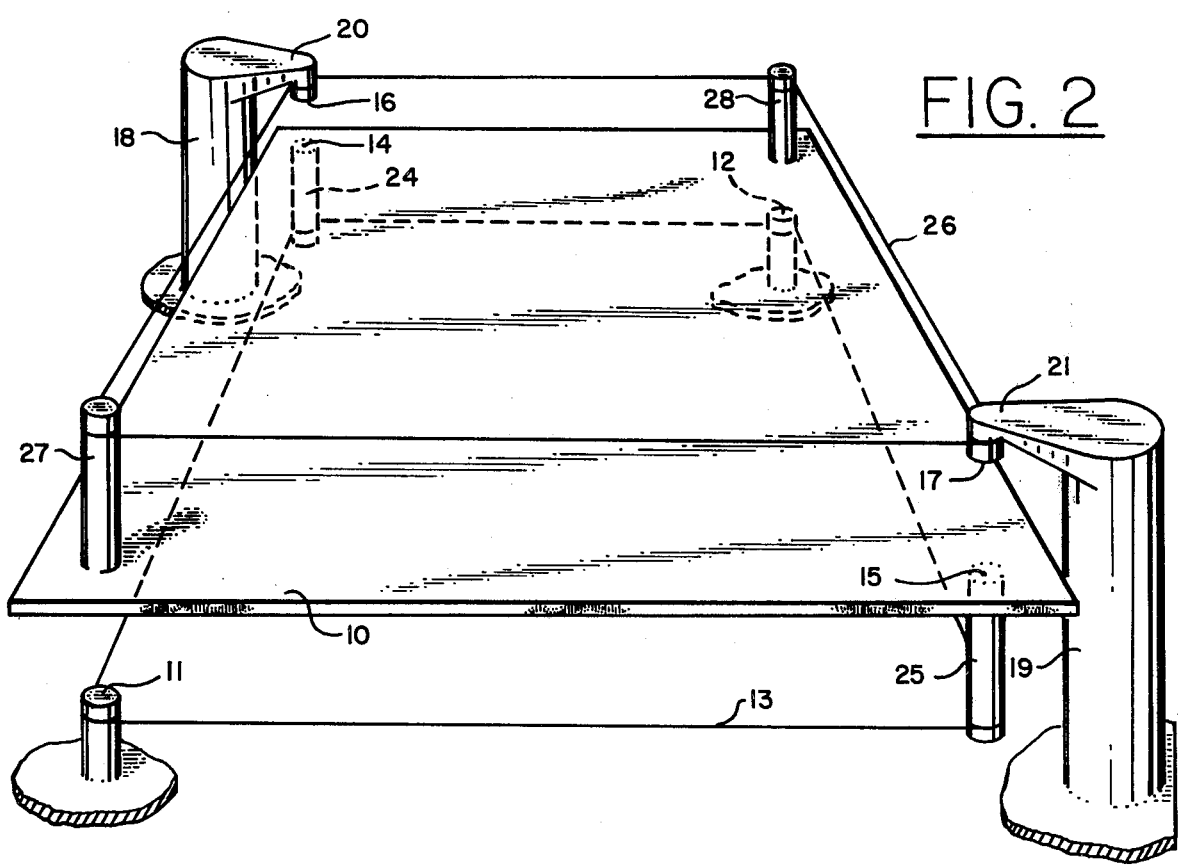
FIG. 2 illustrates the plate of FIG. 1 with a second taut line tethering the free corners to fixed posts positioned over the corners tethered.

To inhibit rotation of the plate without restricting displacement of the plate in response to a force applied anywhere on the plate, a second set of posts oriented 90° from the first set and a second taut rectangular loop line connected to the second set of posts is used to tether the free diagonally opposite points of the plate, i.e., the free corners in the case of a rectangular plate. The manner in which that is done is shown in FIG. 2 wherein the reference numerals employed in FIG. 1 refer to like parts. The second set of posts, short posts 16 and 17, are shown as being connected to the same base or frame as the first set of posts (11, 12) by columns 18 and 19 having arms 20 and 21 extending over respective points 14 and 15 of the plate tethered to the first set of posts. To accomplish that, the plate 10 is made sufficiently large to overhang the first set of posts, and the lengths of the arms are made to center the second set of posts 16 and 17 over the points 14 and 15. Since the plate now overhangs the first set of posts, it is necesssary to affix stubs 24 and 25 under the respective points 14 and 15 and to connect the taut line 13 to these posts. A taut line 26 then connects the free corners of the plate to the short posts 16 and 17 through respective stubs 27 and 28. Any force now applied to the plate thus suspended by two taut lines will not cause rotation of the plane because any rotation that might be caused if only one taut line were used is inhibited by a torsion couple through both taut line planes.

A plate suspended as shown in FIG. 2 forms a torsion stabilized platform that could itself be used to implement a linear response force balance system. This system, though more compact and simpler in construction than other torsion stabilized planes, has several of the common shortcomings of the prior art. It has seismic impulse susceptibility, particularly in the vertical direction, and is not perfect in torsion stability. To avoid seismic impulse susceptibility and to eliminate the vertical axis alignment change (though small) consequential to off center loading or unloading of the plane 10, a second plate is supported by the first plate and suspended by two taut lines in the same manner as the first plate. When the second plate is loaded by a vertical force, any shift in alignment of the vertical axis of motion of the second plate will be between the second plate and the first plate. This relative motion is rotational in nature, but will not be affected by any torsional loading caused by a force that is either not perpendicular to the plane or off center. This is because each plate is restrained as to any lateral motion in its own plane, but free to move in a direction normal to its plane. The result is a linear response force balance system that may be employed to weigh an unknown mass in a manner analogous to a one-arm balance using one plate as the receiving pan for the unknown mass and known weights to be subtracted until the relative position of that plate to the frame is restored. The other plate is used as the counterweight of the balance to null the position of the first plate to the frame for a balanced condition.

Figure 3:
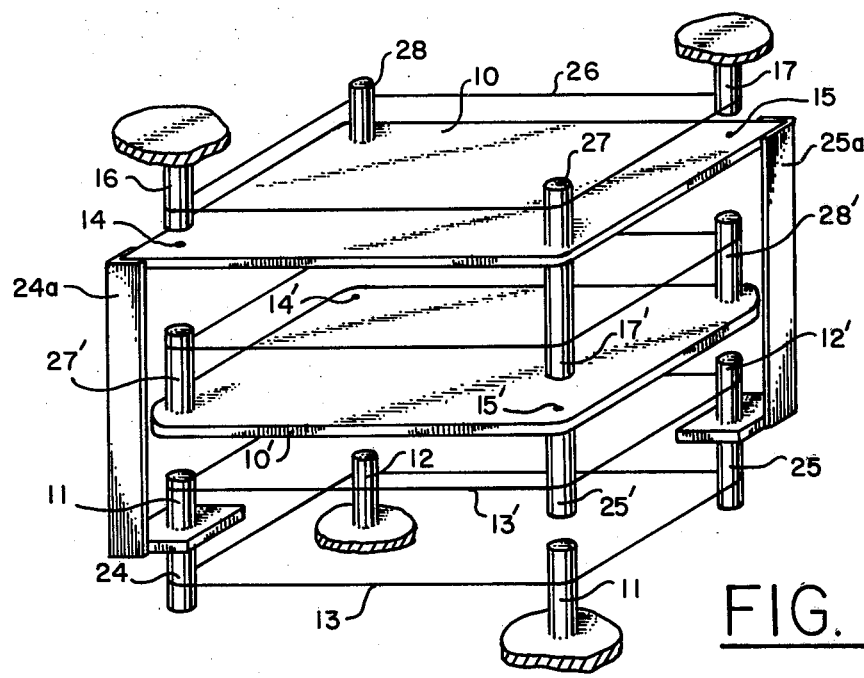
FIG. 3 illustrates a second plate restrained by two taut lines in respect to the first plate.

FIG. 3 illustrates schematically the arrangement of two plates, each effectively supported as in the arrangement of FIG. 2, but with the support of the second plate being relative to the first plate. For ease of understanding this arrangement, the same reference numerals have been employed for the first plate 10 as for like parts in FIG. 2, and the corresponding parts for the second plate 10', identified by the same set of reference numerals, will be distinguished by a prime mark. To further facilitate understanding FIG. 3, it should be noted that the orientation of plate 10 has been rotated counter clockwise by 90°, and the taut line 26 is tethered to short posts 16 and 17 protruding from an overhead platform (not shown). The other taut line 13 for the first plate 10 is shown tethered to short posts 11 and 12 extending from a platform. To accommodate the second plate 10' between the first plate and the platform, the stubs 24 and 25 are fixed in an extended position under the points 14 and 15 by brackets 24a and 25a.

Orientation of the second plate 10' is the same as the plate 10 in FIG. 2. Consequently, the manner in which it is supported on the first plate may be readily understood from the description of FIG. 2, keeping in mind that the first plate 10 is the supporting platform for the second plate 10'. To achieve that arrangement, it is only necessary to affix the short overhead posts 16' (not shown) and 17' to the underside of the first plate 10, and to affix the posts 11' and 12' to brackets 24a and 25a employed to position the stubs 24 and 25.

Figure 4:
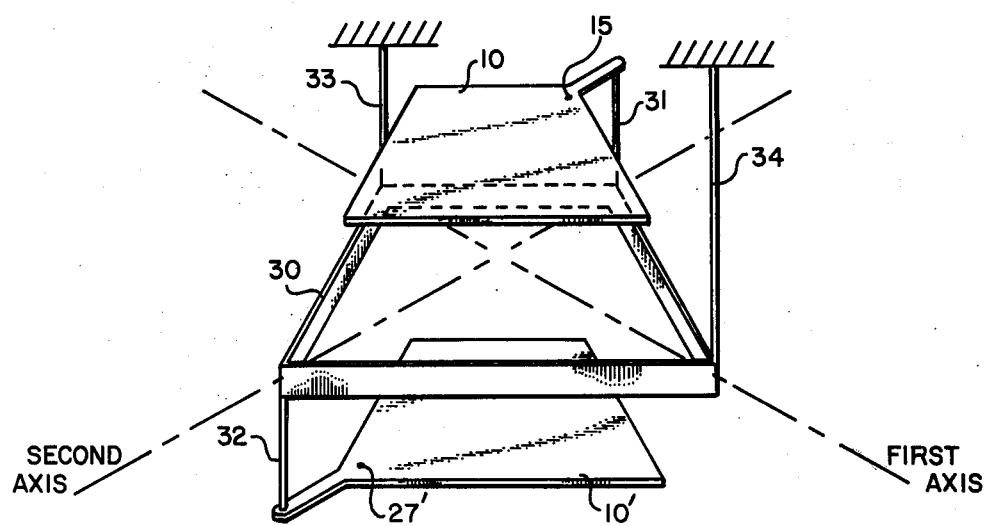
FIG. 4 illustrates schematically the manner in which the two plates of FIG. 3 are coupled by a biaxial lever.

Plates 10 and 10' may be made to move mutually normal in opposite directions by connecting them with biaxial (box) lever 30 shown in FIG. 4. The box lever 30 is connected at diagonally opposite corners by flexible straps 31 and 32, and connected to a supporting platform at its other diagonally opposite corners by flexible straps 33 and 34 such that vertical motion of one plate produces a corresponding vertical motion of the other plate, but in opposite directions due to torsion of the box lever about a first axis passing through its secured corners, and stability about a second axis. A vertical force on the top plate, such as produced by an unknown mass on the top plate, will cause the top plate to be displaced downwardly. That in turn will cause the lower plate to be displaced upwardly. A counter balancing force on the lower plate will thus restore the position of the upper plate. Once connected, and with a fixed mass for plate 10′, there can be no change in any torsion loading to taut bands 13′ and 26′. Off center loading or unloading of plate 10 which could affect torsion is in vertical axial alignment (through action of taut lines 13 and 26) to the frame and cannot change the relative vertical axial alignment of plate 10′ to plate 10. At null (when lifted weights equal the unknown load) both plates 10 and 10′ will have equal sensitivity to seismic impulses received through straps 33 and 34 from the frame. Each plate will receive the same impulse in the same direction and no relative displacement between them will occur as they both would change position in space together. Thus the major shortcomings of the prior art have been overcome in that this system rejects seismic stimuli and the vertical alignment of the known and unknown weights is not affected by off-center loading, or by unlevel or unstable footings.

Application of the invention to a small portable precision balance will now be described with reference to FIG. 5 which has been partially sectioned diagonally. The balance constructed as described with reference to FIGS. 3 and 4 is enclosed in a case 40. The case provides a rigid support for the overhanging posts 16 and 17. The taut line 26 is implemented as a band connected to the posts 16 and 17 and to the stubs 27 and 28 of the plate 10. (Only the stub 27 in the front right corner may be seen.) The other taut line 13 for the plate 10 is also implemented as a band connected to posts 11 and 12. (Only post 11 in the front right corner may be seen.)

The line 13 is also connected to stubs 24 and 25 which are in turn rigidly connected to the top plate 10 as described with reference to FIG. 3. A rigid corner leg 25a′ extends vertically down from the upper plate 10 to support the stub 25. Note that the upper end of the stub 25 is connected to the taut line 13′. In that manner opposing stubs 12′ and 25 shown in FIG. 3 are in practice implemented by a disc-shaped member rigidly affixed to a horizontal bracket 41 at the lower end of the leg 25′a.

The diagonally opposite corner of the plate 10 also has a leg 24′a extending downwardly to which the stub 24 is attached. As in the case of the stub 25, the upper end of the stub is connected to the taut line 13′, thus serving as both the stub 24 and the stub 12′ shown in FIG. 3. For rigidity, the leg 24′a should have an L-shaped cross-section, as in the case of the leg 25′a, but because it is necessary to connect the box lever 30 to the lower plate 10′ at a corner diagonally opposite the corner of the upper plate 10 to which the box lever is connected (via the leg 25′a), the leg 24′ is provided in two displaced parts, the second part being a leg 24″a. Both of those legs are connected by a bracket 42 to the stub 24 to which the taut lines 13 and 13′ are connected at opposite ends.

The lower plate 10′ has stub 25′ extending downwardly from the right hand corner on the near side, as shown schematically in FIG. 3. The diagonally opposite corner of the plate 10′ also has a stub extending downwardly. Both of those stubs are connected to the taut line 13′ which is tethered at its other diagonal corners to the upper plate 10 via the corner legs. The free corners of the plate 10′ (lower left and upper right corners in FIG. 5) are connected to the remaining taut line 26′ through stubs 27′ and 28′ to complete the assembly shown schematically in FIG. 3.

The upper right corner of the upper plate 10 is connected to the box lever 30 via a bracket 43 connecting the leg 25′a to the flexible strap 31. The diagonally opposite corner of the lower plate 10′ is similarly connected to the box lever 30 by flexible strap 32 and a bracket 44. These flexible straps made from flat spring steel, for example, are shown schematically in FIG. 4. The remaining corners of the box lever are connected to the case 40 through flexible straps, such as the strap 34 at the near corner as illustrated in FIG. 5 and schematically shown in FIG. 4. Each flexible strap is connected at its lower end to a disc 45 affixed to the lower end of a tube 46 extending downwardly from the box lever. The upper end of the strap 34 is secured to the case 40. In that manner the flexible strap 34 connecting the box lever to the case is made longer to allow for greater flexibility.

Figure 5:
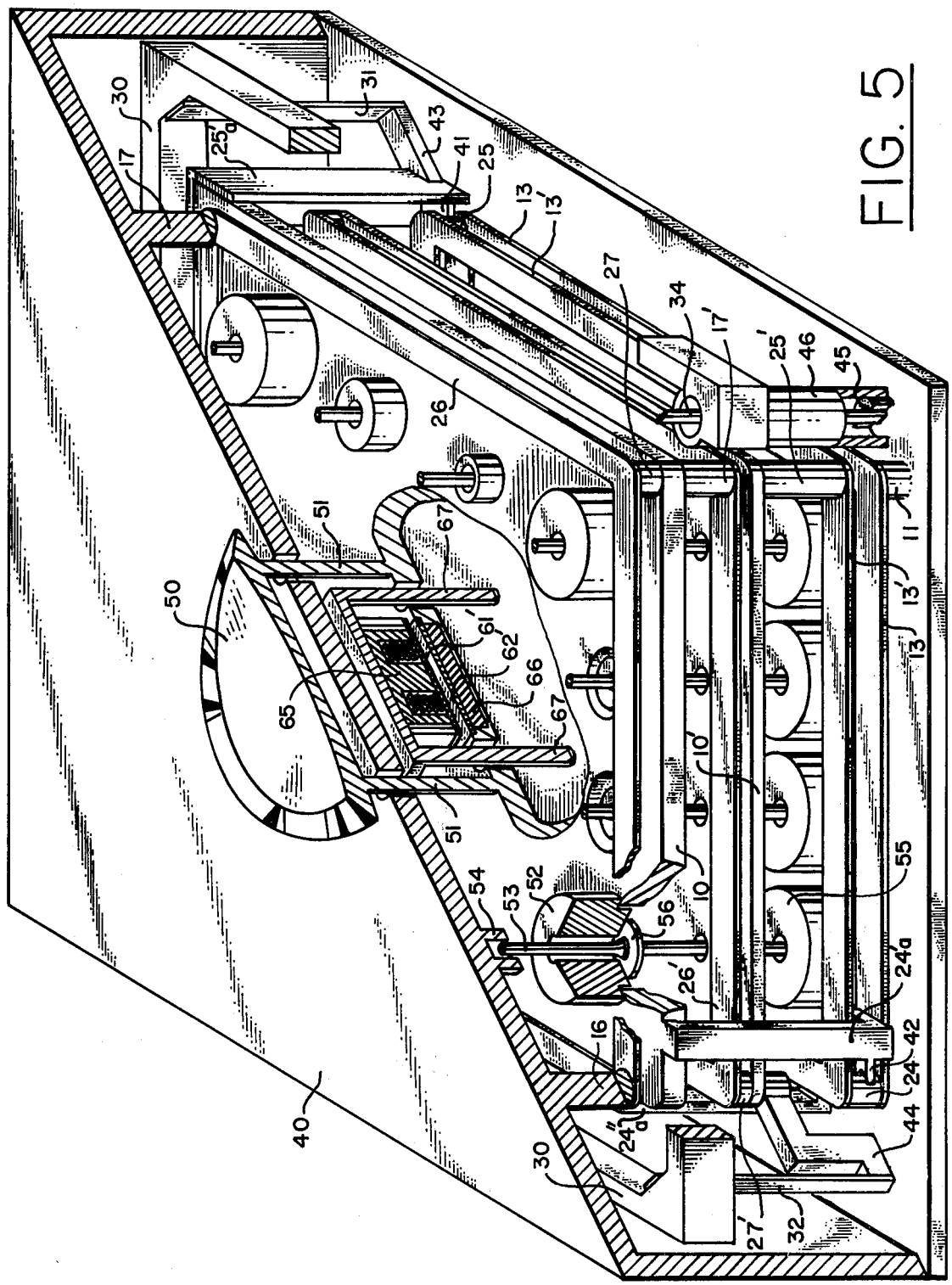
FIG. 5 illustrates a one-arm balance incorporating the principals illustrates in FIGS. 1 to 4.

A weighing pan 50 is connected to the top plate 10 through four evenly spaced rigid rods 51 (only two of which are shown in FIG. 5). Also supported by the plate 10 are all of the known weights, such as annular weight 52, of graduated size to be removed during the course of weighing an unknown mass placed on the pan 50. From the description so far presented, it is evident that when a weight is placed on the pan, a vertical force on the plate 10 will displace it downwardly. That displacement will, through the action of the box lever 30, displace the lower plate 10′ upwardly. The result is that the plates 10 and 10′ are displaced toward each other under the force of the unknown mass. That displacement can be sensed and counteracted by removing the proper combination of known weights from the plate 10. Assuming the displacement sensing means has been adjusted to read zero before the unknown mass is placed on the pan 50, it is then merely a task of systematically seeking for the right combination of known weights to be removed from the plate 10 to restore the "zero" displacement. The sum of the weights removed will equal the weight of the unknown mass.

Each known weight, such as the annular weight 52, is seated over a hole in the upper plate 10 and centered around a rod 53. The upper end of the rod fits into a guide 54, and the lower end fits into a solenoid 55 which, upon being energized, moves the rod upwardly. A flange 56 is secured to the rod at a position just below the weight 52 (while the solenoid is deenergized). That flange engages the weight 52 to lift it from the plate. When the correct combination of weights has thus been lifted by energizing the respective solenoids, a balance is reached between the unknown weights.

Figure 6:
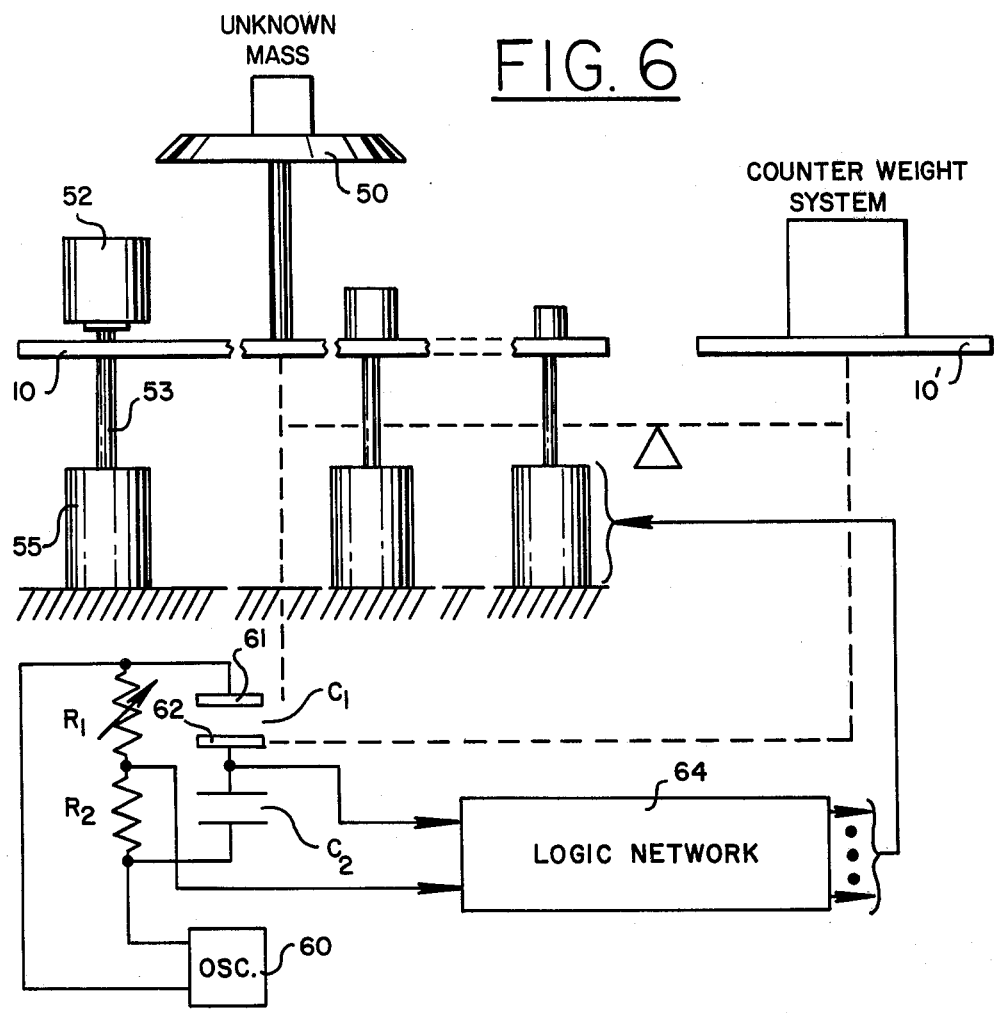
FIG. 6 illustrates schematically the manner in which known weights are lifted in the one-arm balance of FIG. 5.

The upper plate 10, pan and known weights constitute a one-arm balance having as a counterweight the second plate 10′ preloaded by fixed weights, or by simply the mass of the plate itself. The box lever 30 provides the only load transmission from one plate to the other. The two balance plates may thus be viewed as two pans balanced on a beam as schematically illustrated in FIG. 6. When the beam is balanced, the capacitance $C_1$ formed by plates 61 and 62 will, for instance, be equal to $C_2$ and a bridge circuit comprised of capacitances $C_1$ and $C_2$ and resistors $R_1$ and $R_2$ will be balanced such that a logic network 64 will detect a null or "zero." A potentiometer may be provided in one arm of the bridge to balance the bridge for an initial condition even though the capacitance $C_1$ does not exactly equal $C_2$.

Once an unknown mass is placed on the pan, the capacitor plates 61 and 62 are brought closer together by the action of the mechanical linkage between the two plates 10 and 10', namely the box lever 30. That unbalances the bridge to produce a signal which is detected by the logic network 64 to set in motion a systematic process of lifting weights from the plate 10 until balance is restored, i.e., until the bridge is again balanced.

The process may be one of successive approximation in which the largest known weight is removed. If the bridge is then unbalanced in the opposite direction to reverse the polarity of the signal detected by the network 64, the solenoid energized to lift that weight is deenergized, and the solenoid of the next largest weight is energized. If the bridge is not unbalanced in the opposite direction by the lifting of any weights, its solenoid is retained energized until all of the weights have thus been tested. The weight of the unknown mass is thus the sum of the weights required to be removed to restore balance.

This successive approximation process requires only a finite number of steps, namely a number equal to the total number of weights, if the weights are graduated in a binary scale such that each successive one is reduced in weight by a factor of 2. In practice, however, it is desirable to have the weights graduated in a metric (decimal) scale. That will, of course, complicate the logic network, but the same general approach could be used, particularly if each approximation is first tested for balance by an equivalent electromagnetic force. The logic network compares the error signal electronically with predetermined reference values to select the first trial weight to be lifted, then applies an equivalent electromagnetic force to the plate 10. If that test is successful, the electromagnetic force is removed, and at the same time the accepted trial weight is removed. This more complex logic network will, in the end, save weighing time by lifting only those weights which are accepted by the electronic test. Again, the weight of the unknown mass is equal to the sum of the weights removed.

The following is a typical weighing cycle for an unknown mass of 17.943 grams.

| Step | Analog Level | Active Signal | Machine Action | Weights Lifted | Remaining Unbalance |
|---|---|---|---|---|---|
| Load added | — | | start | 0 | 17.943 |
| 1 | 20 | Excessive | proceed | 0 | 17.943 |
| 2 | 10 | In Range | lift, lock | 10 | 7.943 |
| 3a | 8 | Near Range | lift, stabilize | 18 | −.067 |
| 3b | | In Excess | drop | 10 | 7.943 |
| 4 | 4 | In Range | lift, lock | 14 | 3.943 |
| 5 | 2 | In Range | lift, lock | 16 | 1.943 |
| 6 | 1 | In Range | lift, lock | 17 | .943 |
| 7 | .8 | In Range | lift, lock | 17.8 | .143 |
| 8 | .4 | Excessive | proceed | 17.8 | .143 |
| 9 | .2 | Excessive | proceed | 17.8 | .143 |
| 10a | .1 | Near Range | lift, stabilize | 17.9 | .043 |
| 10b | | In Limits | stop | | |

In this procedure, the trial level is tested before lifting a corresponding known weight. If found to be in excess of the unbalanced mass, the next lower trial level is used. If that is found to be in range, i.e., well below the unbalanced mass, the corresponding known weight is lifted and locked in position. If the trial level is found to be near the range of the unbalanced mass, i.e., equal to the unbalanced mass within a tolerance of predetermined value, the corresponding weight is lifted and the balance is allowed to stabilize. If the transducer for the position of the plate 10 indicates that the plate has been moved above its starting (zero) position, the weight just lifted is found to be in excess and therefore dropped. Otherwise it is found to be in range and retained. The procedure could be carried out for accuracies greater than 0.1 gm by providing additional sets of known weights (0.08 to 0.01 gm and 0.008 to 0.001 gm). Resolution to ±0.3 gm is feasible.

The transducer to be employed for this high resolution is preferably a balanced capacitor bridge which may have two fixed capacitor plates and one movable plate linked to the box lever 30 or one of the plates 10 and 10', as schematically illustrated in FIG. 6, or a fixed capacitor and a variable capacitor having its two plates linked to the plates, one linked to the plate 10 and the other to the plate 10', as shown in FIG. 5 for the preferred embodiment. The plates, identified by the reference numerals 61' and 62', are affixed to a servo electromagnet 65 and an armature pole piece 66, respectively. The electromagnet is connected to the plate 10' by four equally spaced rods 67 (only two of which are shown) passing through holes in the plate 10, and the armature pole piece 66 is embedded in the plate 10. The plates 10 and 10' are preferably made of nonmagnetic material, such as copper or an alloy of copper, in order to render the plates immune to any electromagnetic forces, except through the armature 66, and the case 40 is preferably made in part of a metal having high flux permeability to shield the pan 50, and the unknown mass placed thereon from any magnetic flux within the case 40.

Figure 7:
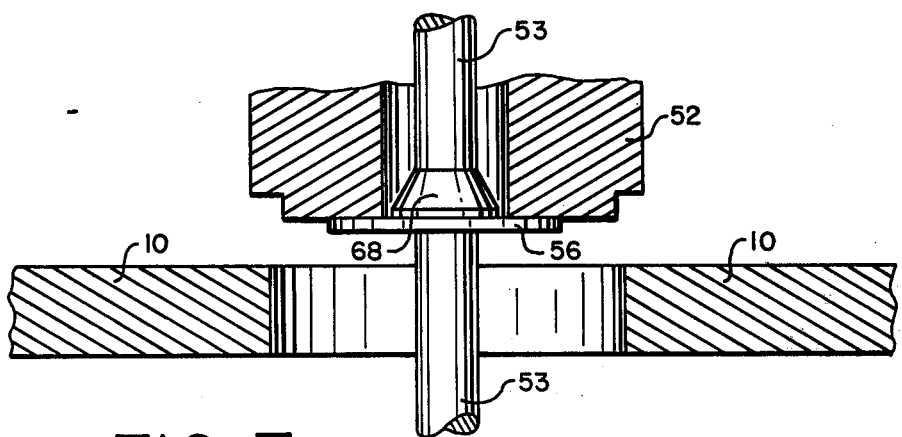
FIG. 7 illustrates detail of the weight lifters used in the one-arm balance of FIG. 5.

FIG. 7 illustrates the manner in which a tapered annular bracket is used both to affix the flange 56 to the weight lifting rod 53 and to center the weight 52 over the rod while lifted. If the weight is off center when the rod solenoid is energized, the inside edge of the annular weight will slide on the tapered bracket to align the weight in the position shown. The conical portion of the bracket 68 thus serves as a cam to force the weight 52 into alignment with the rod 53. The lower part of the bracket is cylindrical so that when the weight does reach a position of alignment, it will drop onto the flange 56. That cylindrical portion helps assure that the weight remains aligned until the solenoid is deenergized to lower the weight onto the plate 10. The weight is undercut so that a portion will enter the hole in the plate 10 as the rod flange assembly is lowered. That will assure that the weight will remain aligned as it seats on the plate 10.

Figure 8:
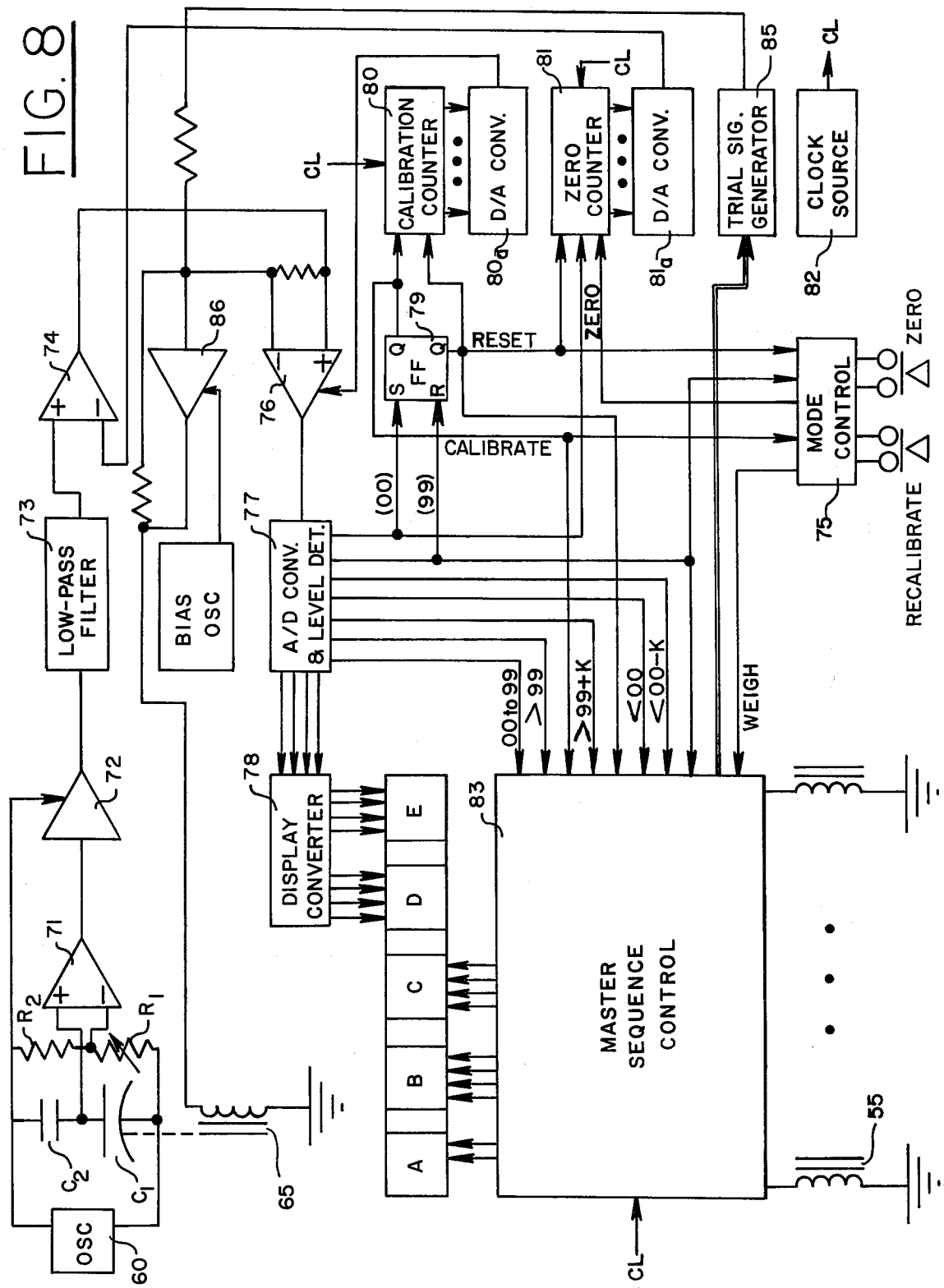
FIG. 8 is a block diagram of the logic network for the one-arm balance of FIG. 5.

FIG. 8 illustrates an exemplary arrangement for the logic network 64 implementing the general procedure outlined above using a capacitor bridge excited by the oscillator 60. The output of the bridge is amplified in a differential amplifier 71, and a phase detector 72 detects both the magnitude and sign of the phase angle between the output of the amplifier 71 and the output of the oscillator. A lowpass filter 73 couples a differential amplifier 74 to the phase detector. The output of the amplifier 74 is thus an "error" signal proportional to the displacement of one plate of the capacitor $C_1$ with respect to the other plate (plates 61' and 62' of FIG. 5), which is directly related to the displacement of the plate 10 relative to the plate 10' from a zero position. As noted hereinbefore, a potentiometer in the bridge may be employed to adjust the error signal to zero for a no load condition (i.e., for no unknown mass on the pan 50), but it is preferred to zero the balance electronically, as will be described presently.

In an initial zeroing mode controlled by a mode control console 75, an error signal (produced before any unknown mass is placed on the pan) is amplified by an error amplifier 76 and converted by an analog-to-digital converter 77. The digital value is displayed on display elements D and E via a display control unit 78 which converts the digital output of the analog-to-digital converter into a conventional 7-bar code for display of error values from 00 to 99.

The analog-to-digital converter 77 also includes level detectors operating on the digital output to determine: when it is in limits (00–99); when it is over range (>99); when it is near range but high (i.e., within the range of 99 and 99 + K where K is a predetermined small quantity); near range but low (i.e., within the range of 0 to −K; when it is under range (i.e., when the error exceeds −K); when it is equal to 99; and when it is equal to 00. The last two are employed to set and reset a flip-flop 79. The flip-flop is initially reset, and it in turn initiates reset of a calibration counter 80, a zero counter 81, control flip-flops in the mode control unit 75 and in a master sequence control unit 83. While it remains in the reset state, its true (Q) output signals the calibration counter 80 and master control unit 83 that the system is active in the first band between 99 and 00 for zeroing. Once set by detecting the first digital output equal to 00, the flip-flop signals that the system error signal is zero.

While in the initial zeroing mode, i.e., while the flip-flop 79 remains set a calibration counter 80 is disabled, and only a zero counter 81 is enabled by a ZERO command signal from the mode control unit, the zero counter 81 is incremented by pulses from a clock source 82 until its output, converted in a digital to analog converter 81a, nulls the error signal at the amplifier 74. In order that this zeroing count will always be in one direction, the bridge network is always unbalanced in one direction with no load on the pan. That can be assured at the time of assembly by the potentiometer $R_1$, for example.

Once the error signal value of 00 is detected, and the flip-flop 79 is set, the mode control unit 75 is switched from the zeroing mode to a calibrated mode. At the same time, the zero counter is disabled. Setting the flip-flop 79 enables the calibration counter and simultaneously causes a known weight of value 99 to be lifted from the plate 10 by a master sequence control unit 83. The calibration counter 80 counts clock pulses from the source 82, and the output of the counter is converted to an analog signal by a converter 80a. That analog signal adjusts the gain of the amplifier 76 until its output, converted to digital form, is detected to be equal to 99. The system is then calibrated and the flip-flop 79 is reset to disable the calibration counter. At the same time, the mode control unit 75 is switched to a weigh mode, and the master sequence control unit is commanded to restore the weight of known value (99 mg) to the plate.

During the weigh mode, an unknown mass placed on the pan will unbalance the bridge from its reference or zero position, causing an error signal at the output of the amplifier 76. The analog converter and level detector will produce signals which will enable the master sequence control unit to initiate trial signals for the weights to determine which weights to remove. A trial signal generator 85 is controlled for that purpose by the master sequence control unit 83 to transmit trial compensation signals to a feedback amplifier 86. The trial signal is stepped down from a high weight value through lower weight values until an appropriate weight is found and lifted as described hereinbefore. If not in excess, the lifted weight is locked in the raised position, if not the system is allowed to stabilize before determining whether to replace the weight or lock it in the raised position. The process is continued until balance has been restored within limits, at which time a signal (00 to 99) stops the master sequence control unit and holds the value of the signal in the converter 77 for display in the elements D and E. The sum of the weights lifted is displayed on the display elements A, B and C. Once the mass just weighed is removed, the master sequence control automatically restores all weights to the plate 10 so that after a brief stabilizing period, another unknown mass can be weighed. Calibration corrects for variations in local gravity, vertical axis alignment and electromechanical sensitivity.

Although a particular embodiment of the invention has been described and illustrated herein, it is recognized that modifications and variations may readily occur to those skilled in the art. It is therefore intended that the claims be interpreted to cover such modifications and variations.

What is claimed is:

1. A system in an environment for suspending a plate adapted to be displaced in space within said environment in response to a force comprised of one pair of taut rectangular loop lines and a set of four elements stationary in space, said elements being disposed in positions at corners of said rectangular loop lines, opposite corners of one line being connected taut to diametrically opposite points on said plate and the remaining corners of said one line being connected taut to diametrically opposite stationary elements, and opposite corners of the other line being connected taut to diametrically opposite points on said plate in line with stationary elements to which said one line is connected and the remaining corners of said other line being connected taut to the remaining stationary elements of said set of elements whereby any small force applied to said plate at any point will displace said plate in linear proportion to said force without any rotation about any axis through said plate.

2. The combination of claim 1 wherein said plate is one of two parallel plates, and wherein said second plate is suspended in the same manner as said one plate using a second pair of taut lines and an additional set of four stationary elements, said additional set of stationary elements being affixed to said one plate so that said second plate is suspended from said one plate just as said one plate is suspended from said environment for the suspension system, whereby any small force applied anywhere to said one plate will displace said one plate in linear proportion to the force without any rotation about any axis through said plate.

3. The combination of claim 2 wherein said set of stationary elements affixed to said one plate for suspending said second plate is oriented 90° from said set of stationary elements from which said one plate is suspended.

4. The combination of claim 3 including: a biaxial lever having a first axis, and a second axis normal to said first axis; means for connecting said biaxial lever at two points along said first axis fixed in space relative to said environment, said fixed points being adjacent diametrically opposite corners of said first and second pairs of taut lines; means for connecting said biaxial lever at one point along said second axis fixed to said one plate at a point connected to one corner of taut lines by which said one plate is suspended; means for connecting said biaxial lever at one other point along said second axis on the opposite side of said first axis to said second plate at a point connected to one corner of said taut lines by which said second plate is suspended, whereby any small force applied to said one plate produces a displacement of said second plate in a direction opposite displacement of said first plate.

5. The combination of claim 4 including a capacitor comprised of two metallic plates, separated by an air gap capacitor plate being affixed to one of said suspended plates whereby displacement of the suspended plate to which affixed varies the air gap, whereby the capacitance of said capacitor varies due to displacement of said suspended plate.

6. The combination of claim 5 wherein the other metallic plate of said capacitor is affixed to the other of said suspended plates, whereby displacement of said suspended plates may be measured with greater sensitivity as a measure of change in said capacitance due to displacement of said suspended plates in opposite directions in response to a small force applied to one of said suspended plates.

7. The combination of claim 5 including means for sensing any change of said capacitance and a servomechanism for producing a force applied to one of said suspended plates for counteracting any change of capacitance sensed by said sensing means by applying a restoring force to one of said plates in a direction opposite to any force tending to displace said capacitor plates.

8. The combination of claim 7 including means for displaying units of restoring force applied by said servomechanism.

9. The combination of claim 8 wherein said means for displaying units of restoring force includes a variable gain signal translating means, and said combination includes means for placing a calibration weight on said one plate and means with memory for adjusting the gain of said signal translating means to display units of restoring force equal to said known calibration weight.

10. The combination of claim 8 including a plurality of known graduated weights on one of said suspended plates wherein said servomechanism applies said restoring force by removing selected ones of said known weights.

11. The combination of claim 10 including electromagnetic means in said servomechanism for applying a restoring force, and means for applying a trial restoring force through said electromagnetic means to determine which known weights to remove in sequence, means for removing known weights in sequence as determined by applying said trial restoring force, whereby the total measure of force displayed is equal to the total of known weights removed plus the value of any electromagnetic force still required to restore a balance condition of said suspended plates restored to initial positions once there is no smaller known weight which can be removed without producing an overbalancing condition.

12. The combination of claim 11 including a means affixed to one of said suspended plates for receiving a mass to be weighed by said servomechanism.

13. A balance mechanism for weighing an unknown mass by automatically lifting known weights in a single-arm mode comprising:

a support member;
two plates, a first rectangular plate supporting said known weights and supporting a pan for receiving said unknown mass to be weighed, and a second rectangular counterbalancing plate coupled to the first through a box lever having diagonal corners connected to a support member through flexible elements that will permit the box lever to pivot about a diagonal axis in response to a vertical force at one free corner connected to a corner of one balance plate or in response to a vertical force at the other free corner connected to a corner of the other balance plate;
a pair of taut rectangular loop lines, one line being connected to diagonally opposite corners of said first plate and to rigid elements affixed to said support member in a position over free corners of said first plate, and the other line being connected taut to free corners of said first plate and to rigid elements affixed to said support member in a position over the other two corners of said first plate;
a pair of taut rectangular loop lines suspending said second plate from said first plate in the same manner as said first plate is suspended from said support member by two taut rectangular loop lines, but oriented 90° from the arrangement for said first plate about an axis normal to said plates, whereby any vertical force on one plate is coupled to the other by said box lever to cause said plates to move in opposite directions while said pairs of taut lines maintain said plates substantially parallel.

14. In a linear response force balance system: two plates suspended parallel to each other from a support member, each plate being secured to said support member by a pair of taut rectangular loop lines, one taut line tethering a first pair of diagonally opposite points of one plate to points affixed to said support member over a second pair of diagonally opposite points of said first plate, where each of said second pair of points is on a line bisecting a line between the first pair of tethered points, and the other taut line tethering the second pair of diagonally opposite points to points affixed to the support member over the first pair of diagonally opposite points on said first plate, said second plate being tethered by a pair of rectangular taut lines in a similar manner to points affixed to said first plate, but with corresponding points oriented 90° about an axis normal to said plates; biaxial means coupling one plate to the other with opposite ends of said means on one axis connected to said support member, and respective opposite ends of said means on the second axis is connected to diagonally opposite tethered points of the first and second plates, where said second axis is normal to said first axis whereby any force applied to one plate will cause said plates to move in opposite directions; metallic capacitor plates disposed opposite to each other, one affixed to one suspended plate and the other affixed to the other suspended plate, and means for sensing capacitance between said metallic plate as a measure of displacement of said suspended plates in linear response to a small force applied to one suspended plate; and servo means responsive to said sensing means for restoring said suspended plates to initial positions, thus providing a feedback signal in said servo means proportional to the force applied to the one plate.

15. The combination of claim 14 for weighing an unknown mass supported by said one plate, wherein said one plate is preloaded with known weights of graduated size and said capacitance detection means is adjusted for an initial condition of no unknown mass supported by said one plate, and means responsive to the magnitude of said feedback signal in said servo means for selecting and lifting weights in a proper combination to thereby reduce said feedback signal to a range within a predetermined linear displacement range, whereby any remaining feedback signal produced by any weight of the unknown mass on said one plate not offset by known weights removed from said one plate is linearly proportional to the balance of the weight of said mass in excess of the known weights removed.

16. The combination of claim 15 wherein said means for converting and displaying includes variable gain signal translating means and said combination includes means for unbalancing said plates by a known weight, and means for adjusting the gain of said signal translating means to display units of restoring force equal to said known calibration weight.

17. The combination of claim 15 including means for converting to digital form and displaying said remaining feedback signal.

18. The combination of claim 16 including means for displaying the value of known weights removed to provide a display of the total weight of the unknown mass to a fine degree of resolution and a high degree of tolerance limited only by the linearity of displacement of said suspended plates relative to each other in response to a small unbalanced force.

* * * * *